O. GROSVENOR.
TONGS FOR TIRE CORES.
APPLICATION FILED FEB. 9, 1915.
1,277,716.
Patented Sept. 3, 1918.
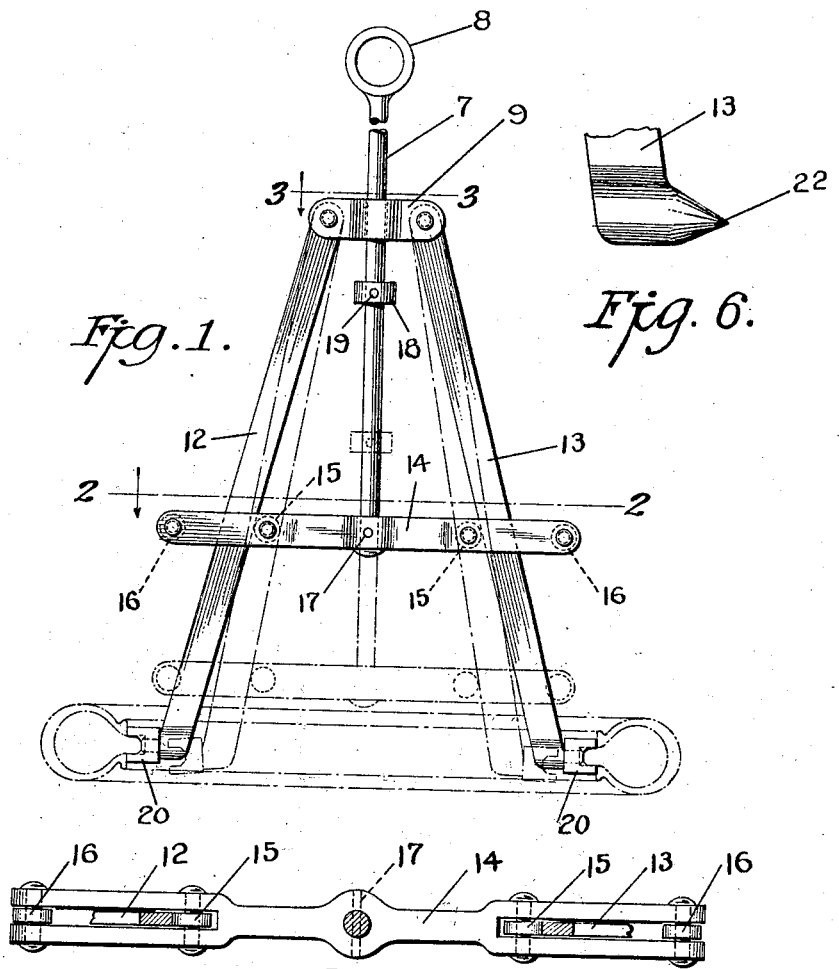
Witnesses:
S. G. Taylor
F. C. Batcheller
Inventor
Oliver Grosvenor.
By his Attorney
Ernest Hopkinson

UNITED STATES PATENT OFFICE.

OLIVER GROSVENOR, OF NEW YORK, N. Y., ASSIGNOR TO MORGAN & WRIGHT, A CORPORATION OF MICHIGAN.

TONGS FOR TIRE-CORES.

1,277,716.   Specification of Letters Patent.   Patented Sept. 3, 1918.

Application filed February 9, 1915. Serial No. 7,137.

*To all whom it may concern:*

Be it known that I, OLIVER GROSVENOR, a citizen of the United States, and a resident of New York city, county of New York, and State of New York, have invented certain new and useful Improvements in Tongs for Tire-Cores, of which the following is a full, clear, and exact description.

This invention relates to tongs for tire cores and has for an object to provide in such apparatus, ease of manipulation, simplicity of construction, and a strong gripping means when in use.

I accomplish my object by novel improvements, more fully set forth in the following specification and illustrated in the accompanying drawings, wherein—

Figure 1 is an elevation of the improved tongs, showing the manner of engaging a tire core;

Fig. 2 is a horizontal sectional view taken on the line 2—2 of Fig. 1;

Fig. 3 is a horizontal sectional view taken on the line 3—3 of Fig. 1;

Fig. 4 is a side elevation of one form of one of the gripping members;

Fig. 5 is an end view of the same; and

Fig. 6 is a side elevation of a modified form of gripping means.

In the drawings, 7 designates the supporting rod for the tongs having at its upper end a ring or eye 8 for engagement with a crane or other carrier. Slidably mounted on the rod 7 is a yoke 9 having on each side slots 10 and 11, within which are pivoted the dependent tong-arms 12 and 13 respectively. To the lower end of the suspending rod 7 is attached a cross-bar 14, forked at each end to inclose the arms 12 and 13 respectively. Mounted in the forks are rollers 15, 15, adapted to bear against the inner sides of the arms, and to maintain them in a diverging position. The rollers 16, 16 limit outward movement of the arms and prevent disengagement from the forks. The bar 14 may be rotatably mounted on the rod 7, or rigidly fixed as by means of the pin 17. The rod 7 is also provided with a collar 18 fixed in the desired position between the yoke 9 and the bar 14 by means of a pin or set-screw 19, for the purpose of limiting its relative upward movement when without load.

At the lower ends of the arms 12 and 13 are attached grippers 20, 20, for engaging a tire core. In my preferred embodiment shown in Figs. 4 and 5 these are revolubly mounted on headed projections 21 of the tong arms and grooved to overlap the inwardly projecting portion of a tire core. Other means may be equally suitable, however, as for instance merely providing the tong arms with laterally extending points such as that shown at 22 in Fig. 6, to engage the recesses which are provided about the inner periphery of a core. In either case the core engaging means form pivots for the core at opposite points thereof, upon which pivots the core may be turned when applying or removing it from the tire building machine.

The operation of my tongs is extremely simple. The device is suspended by attaching the ring or eye 8 to a crane, hoist, or other suitable conveying means. An upward pull thereon causes the rod 7 to slide upwardly through the yoke 9. This upward movement causes the cross-bar 14 to change from the position shown in broken lines to that shown in full lines, causing a corresponding expansion of the arms 12 and 13 until the gripping means 20 engage a core such as that indicated on the drawing in broken lines.

My tongs, it may be seen, will therefore, without adjustment, fit any size of core, the heavier it is the stronger being the grip upon it, the only limit to the weight to be carried being strength of the material of which the tongs are constructed.

Having described my invention, what I claim and desire to have protected by Letters Patent is:

1. Lifting tongs for tire cores comprising relatively separable parts, members projecting outwardly from said parts adapted to engage the inner periphery of a tire core at opposite points and form pivots upon which the core may be turned, means adapted to force said parts away from each other when moved longitudinally of said parts, and a supporting device for the tongs attached to said means.

2. Lifting tongs for tire cores comprising relatively separable parts, grippers turnably mounted on said parts and having grooves to receive the inner projecting portion of a tire core at opposite points thereon, said grippers forming pivots upon which the core may be turned, means adapted to force said parts away from each other when moved longitudinally of the parts, and a supporting device for the tongs attached to said means.

3. Tongs for tire cores comprising a suspending rod, a yoke slidably mounted on said rod, arms dependent from said yoke, means on said arms for engaging a tire core, a transverse bar attached to said suspending rod below said yoke, and means mounted on said bar engaging said arms and adapted to expand the same when said suspending rod is raised.

4. Tongs for tire cores comprising a suspending rod, a yoke slidably mounted on said rod, arms dependent from said yoke, means on said arms for engaging a tire core, a transverse bar attached to said suspending rod below said yoke forked at each end to engage said arms, and rollers mounted in said forks bearing against the inner sides of said arms and adapted to expand the same when said suspending rod is raised.

Signed at New York, N. Y., this 6th day of February, 1915.

OLIVER GROSVENOR.

Witnesses:
 FRED C. BATCHELLER,
 FRANCIS BOYLE.

Copies of this patent may be obtained for five cents each, by addressing the "Commissioner of Patents, Washington, D. C."